June 4, 1968 J. P. FIELD 3,387,092

TANDEM TRUNKING HAVING INCOMIMG AND OUTGOING
APPEARANCES IN A CROSSBAR MATRIX

Filed July 16, 1965 2 Sheets-Sheet 1

INVENTOR.
J. P. FIELD
BY
ATTORNEY

United States Patent Office 3,387,092

Patented June 4, 1968

3,387,092

TANDEM TRUNKING HAVING INCOMING AND OUTGOING APPEARANCES IN A CROSSBAR MATRIX

Joseph Patrick Field, Hato Rey, San Juan, Puerto Rico, assignor to International Telephone and Telegraph Corporation, a corporation of Delaware Filed July 16, 1965, Ser. No. 465,510
9 Claims. (Cl. 179—18)

ABSTRACT OF THE DISCLOSURE

A tandem trunk circuit is given both an incoming and an outgoing appearance in a crossbar switching matrix. When the incoming call digital information representing a subscriber line is received, the same digital information establishes the outgoing call. Thus, there is no need to generate artificial digital information for placing an outgoing call.

This invention relates generally to crossbar switching circuits and more particularly to tandem trunking through unitary networks of crosspoints. The invention finds especial—although not exclusive—utility in a system using the unitary network disclosed in a co-pending application entitled, "Automatic Switching System," S.N. 430,136, filed Feb. 3, 1965 by Erwin, Field and Mahood and assigned to the assignee of this invention.

Recently, an automatic switching system has been developed through the use of crossbar switches having a unitary field of crosspoints. More particularly, most switching networks comprise means for concentrating and expanding traffic. The concentration occurs because many inlets (usually called "line appearances") are connected to a few outlets (sometimes called "junctors" or "links") via a number of cascaded crosspoint matrix stages. The inlets are only used occasionally so that the traffic through the first stage is sparse and the crosspoints are used relatively inefficiently. At each succeeding stage in the cascade, the traffic is concentrated so that crosspoint efficiency goes up. Finally, the traffic reaching the outlets is so concentrated that virtually all outlets are used as constantly as is permitted by the allowed grade of service. The reverse process occurs in the expansion network. Generally, the concentration stage leads from a calling line to a link and the expansion stage leads from the link to a called line.

A unitary network does not provide separate concentrating and expanding matrices. The crossbar switches used in a unitary network are constructed in the well known orthogonal arrangement of vertical and horizontal crosspoints. However, unlike the switches used in conventional networks, these switches are arranged so that various sections of the verticals are electrically isolated from each other (a so-called "split vertical"). Individual vertical splits perform either a concentrating or an expanding function so that every vertical can provide the functions of an entire cascaded series of matrices.

A unitary network, such as this, presents some problems when it is necessary to direct two-way traffic through it. An example of such two-way traffic is presented by tandem trunking. The problem occurs because incoming traffic received over a trunk line must be concentrated and outgoing traffic sent over the same trunk line must be expanded. Therefore, opposite switching functions must be given to the same line in accordance with the direction of traffic flow.

Accordingly, an object of the invention is to provide new and improved means for extending two-way or tandem trunking through a unitary network. In this connection, an object is to facilitate the concentration or expansion of traffic either to or from the same trunk line.

In accordance with one aspect of the invention, each trunk line has two appearances in the unitary network. One is at the point of the maximum traffic concentration, and the other is at the point of the minimum traffic concentration. Incoming trunk calls are received, inserted into the traffic pattern, and processed at the point of least traffic concentration in the same manner that originating calls are received, inserted, and processed. Outgoing trunk calls exit from the network at the link appearance and are processed as if they were directed to the links which are at the point of maximum traffic concentration. Since the traffic on any trunk line can be extended in either of two directions, each trunk line can be used as if it were either an originating line or a terminating link.

The above mentioned and other objects and features of this invention and the manner of obtaining them will become more apparent and the invention itself will be best understood by reference to the following description of an embodiment of the invention taken in conjunction with the accompanying drawings in which.

Figure 1:
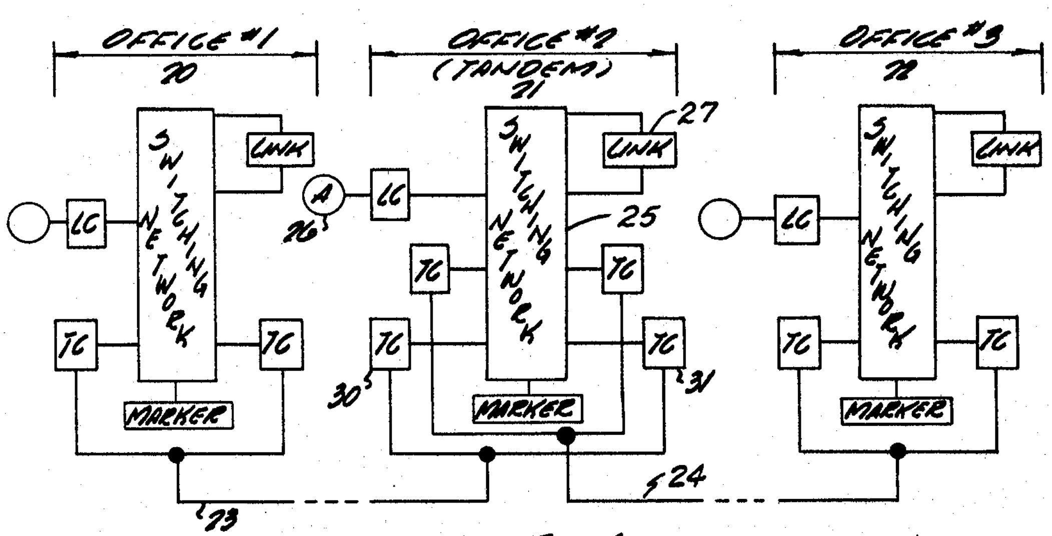
FIG. 1 is a block diagram showing a telephone switching system having three offices interconnected by two-way trunk lines.

Three telephone offices 20, 21, 22 (FIG. 1) are interconnected by two-way trunk lines 23, 24. Each office comprises a unitary network of marker controlled crossbar switches, one such network being shown at 25.

Many subscriber lines, such as 26, are connected via individual line circuits "LC" into the network at points of minimum traffic concentration. A few control links or junctors, such as 27, are connected into the network at link side points of maximum concentration. A normal function of the network is to concentrate traffic from a calling one of the many lines to a selected one of the few links and then to expand the traffic from the selected one of the few links to a called one of the many lines.

If traffic over trunk line 23 arrives at office 21, it is inserted into the local traffic pattern through network 25 in the same manner as traffic is inserted into the network when a call is originating at a local line. On the other hand, if traffic is sent from office 21 over trunk line 24 to office 22, it must exit from the local traffic pattern as if it were being received at a link from a local line.

To accomplish this distribution of traffic, every trunk is connected to two appearances in the network via two separate trunk circuits TC. One appearance (such as 30) is at the line appearance or point of minimum traffic concentration. The other appearance (such as 31) is at the link side or point of maximum traffic concentration. This way traffic from a trunk is inserted into the network at a line appearance as if it were from a calling line. Traffic to a trunk is taken from the network at the link side or the point of maximum concentration. Tandem trunking is a combination of these two processes wherein incoming trunk traffic is concentrated through an exchange network to become outgoing trunk traffic.

Before explaining how this is accomplished, it may be well to briefly review the construction and operation of the unitary network disclosed in the above identified copending Erwin, Field, and Mahood application. More information may be obtained from a study of the application.

Figures 2, 3:
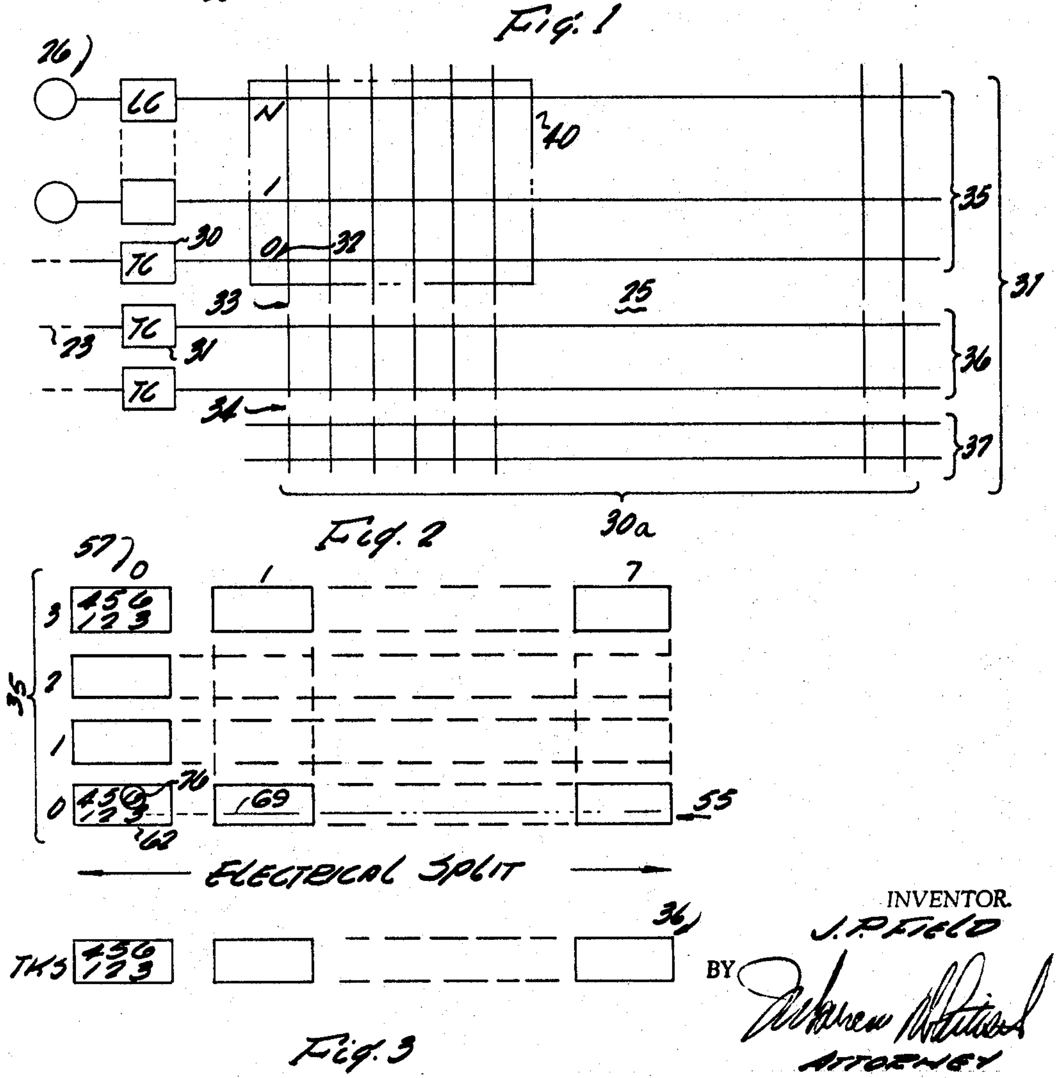
FIG. 2 is a schematic circuit diagram showing part of a unitary matrix constructed as taught in the above identified Erwin, Field, and Mahood application.
FIG. 3 is a symbolic block diagram representation of the FIG. 2 network which is provided to explain the selecting process.

FIG. 2 shows an exemplary portion of that Erwin et al. network. It includes one or more crossbar switches having crosspoints arranged in a well-known vertical 30 and horizontal 31 array. The crosspoint switches (one of which is shown at 32) are at the intersections of these verticals and horizontals. The verticals are divided into functional groups by electrical splits symbolically shown at 33, 34. The line appearances or points of minimum traffic concentration appear in the horizontal group 35. The link side or points of maximum traffic concentration appear in the horizontal group 36. The horizontal group 37 is for making intra-network connections between the other two groups 35, 36, and is not important to the present invention. It is, therefore, apparent by inspection of FIGS. 1 and 2 that the trunk 23 has a double ended appearance 30. One appearance is at maximum and the other 31 at minimum traffic concentration locations.

In FIG. 2, the subscriber line 26 is shown as connected to an "Nth" horizontal level in group 35. Other subscriber lines are similarly connected to other horizontal levels in the group 35. The trunk circuit 30 is connected to the "0" level. Thus, it should be apparent that traffic incoming from the trunk line 23 is inserted into the network traffic pattern as if it were from a local calling subscriber line. In addition, the same trunk line 23 is connected via trunk circuit 31—as if it were a link—into the maximum traffic concentration section of 36 of the network. Thus, traffic outgoing to the trunk may be concentrated as all other traffic is concentrated through the network.

The crosspoints in the network are grouped together into selectable blocks, one of which is shown at 40. Each block of crosspoints may include any number of switches as indicated by the letter N. However, the blocks in the particular network that was actually built and tested have two horizontal sets of contacts for each of three verticals to provide network appearances for a total of six lines. There are four horizontal levels and eight vertical groups of these blocks of contacts, as shown in FIG. 3. Thus there are a total of thirty two blocks arranged in four horizontal levels 0, 1, 2, 3 and vertical groups 0, 1, 2, 3, 4, 5, 6, 7.

The line side trunk appearances are in the 0 level of the horizontal group 35. The link side trunk appearances are coupled into the network at level 36.

The network crosspoint selections are made by an operation of two relays which identify the coordinates of a block of crosspoint switches. Then a tripling bar operates to select one crosspoint in the block of crosspoints.

Figure 4:
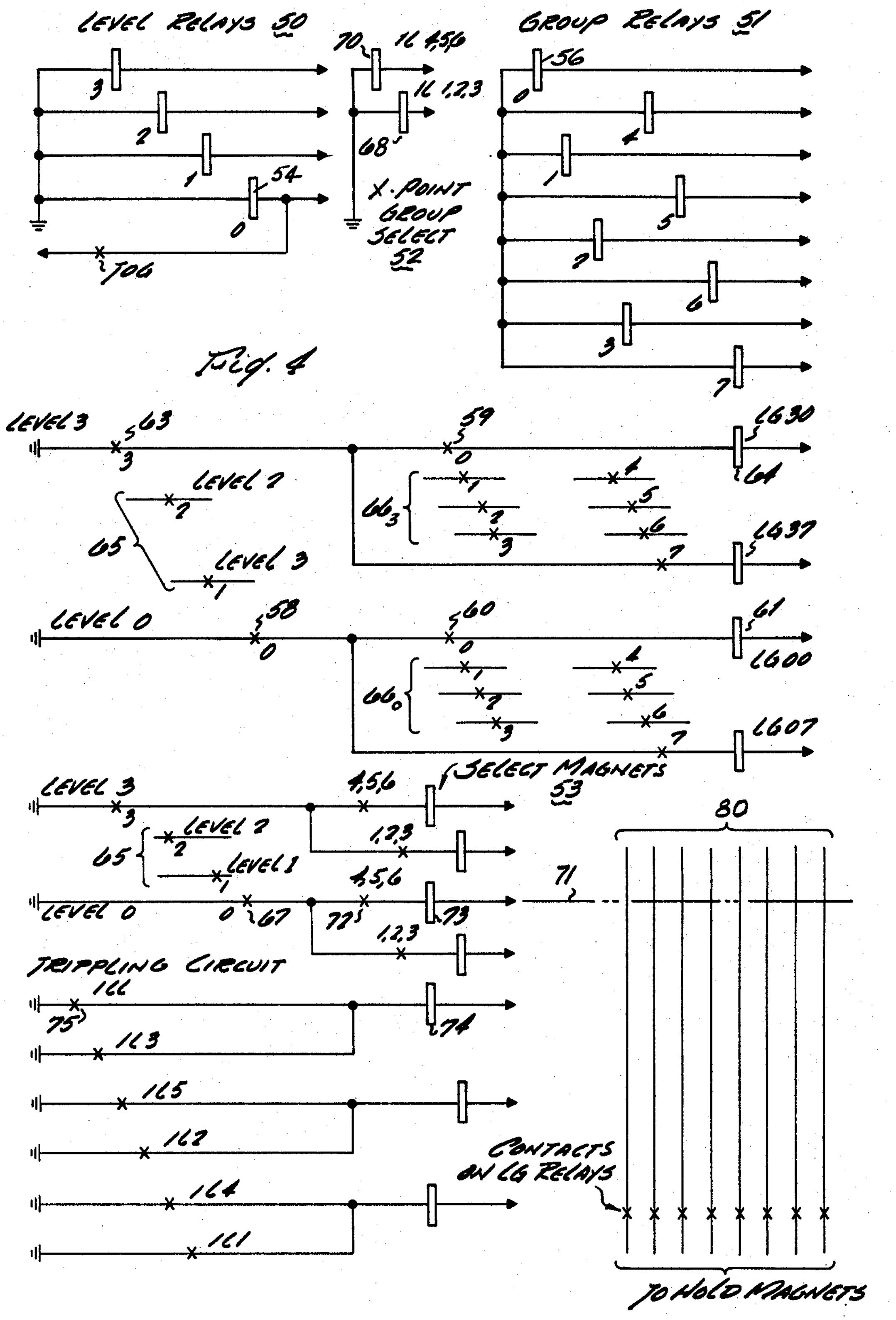
FIG. 4 is a schematic circuit diagram showing a relay circuit for controlling the matrix of FIGS. 2 and 3.

The control circuit for selecting and extending trunk calls is shown in FIG. 4. This circuit contains four level selecting relays 50, eight group selecting relays 51, two crosspoint group select relays 52, and seven crossbar switch select magnets 53. The lowermost three of these select magnets 53 are a tripling circuit. These relays and magnets are operated by a marker in a well known manner, the level selecting relays 50 are numbered "0," "1," "2," and "3," respectively, to correspond to the levels of blocks in FIG. 3. If, for example, the "0" level select relay 54 is operated, the "0" level 55 of crosspoint blocks is selected in FIG. 3.

In a similar manner, one of the eight group select relays 51 is operated by the marker in a well known manner. If, for example, the "0" group select relay 56 operates, the "0" vertical group 57 of crosspoint blocks are selected.

When operated, each of these select relays closes a set of make contacts which form a series or AND circuit. Under the assumption that the "0" relays 54, 56 operate from among both the level and group select relays 50, 51, contacts 58, 59, 60 close. The contacts 58, 60 form an active AND circuit which operates the selected "0, 0" line group (LG) relay 61. This relay 61 selects the "0, 0" block of contacts 62 in FIG. 3. The contacts 59 do not operate any LG relay because the contacts 63 are open. If the "3" level relay had operated, instead of the "0" relay, in the relay group 50, the AND condition would have operated the line group (LG) relay 64 instead of the relay 61.

To simplify the drawing, FIG. 4 shows only the circuits associated with the "0" and "3" levels. However, the contacts 65 indicate that other similar circuits (not shown in detail) are associated with the "1" and "2" levels. In like manner, the contacts 66 indicate that each of the group select relays 51 has a set of contacts corresponding to the contacts 59.

If the "0" level relay 54 operates in group 50, the contacts 67 close. Simultaneously, the marker operates one of two crosspoint group select relays 52 to rotate or swing a select bar clockwise or counter clockwise. If, for example, relay 68 operates, a select bar 69 rotates one way to select the lower set of crosspoint contacts 1, 2, 3 in the crosspoint block 62 (FIG. 3). If relay 70 operates, the select bar 69 rotates an opposite way to select the upper set of contacts 4, 5, 6 in the crosspoint block 62. Thus, if the "0" level select relay 54 and the crosspoint group select relay 68 operate, contacts 67, 72 close to create an AND condition for operating the select magnet 73. This will rotate the select bar 69 to choose the "4," "5," "6" crosspoints in block (FIG. 3).

Finally, one of six individual line (IL) selection relays (not shown) operates in the marker to close one set of the contacts IL1–IL6. This operates one of three select magnets in the tripling circuit to select one of the three verticals in the block 62. If either line 1 or line 4 is selected, the tripling magnet 74 operates to select the right-hand set of contacts "1" and "4" from among the six crosspoints in the block of contacts 62. Under the assumption that the "0, 0" relays 54, 56 operate in groups 50, 51, LG relay 61 and crosspoint group select relay 70 operate and further that contacts 75 are closed, the "6" crosspoint 76 operates in block 62. Any other crosspoint in the switching network could be selected and closed in a similar manner.

The FIG. 4 circuit operates in the following manner. For control purposes, lines are accessed by the selective operation of a combination of thirty-two relays (four level and eight group relays 50, 51). Responsive thereto, a particular line group LG relay operates to extend eight sleeve leads 80 into the marker in which the line group appears. There an individual line relay IL operates to select one line from among six lines in the line sleeve group.

The marker knows which crosspoints are idle and which are busy from idle tests which it performs in any well known manner. By combining the results of the idle tests and the sleeve marking, the marker selects a usable crosspoint.

The incoming trunk appearance is in the "0" level of the line group 35. The outgoing trunk appearance is in the electrically isolated horizontal level 36. When a call is received over an incoming trunk, a register (not shown) accesses the marker on a completing function. It delivers signals to the marker which identify the location of the calling trunk in terms of the group and individual crosspoint locations.

At this time, the marker also receives digit signals which indicate that an outgoing trunk call is being placed. Responsive thereto, the marker operates a "trunk, outgoing" relay (not shown) to close contacts TOG, FIG. 4. This, in turn, pulls "0" relay 54. The marker already has the group and individual identification information stored therein. Therefore, the marker operates an individual line group LG relay, such as 61. The operated LG group relay closes circuits from eight sleeve leads to eight hold magnets (shown symbolically at the lower right-hand corner of FIG. 4).

Since the marker has selected an idle crosspoint, it closes one of the individual line relay contacts IL1 to IL6. This operates a particular crosspoint (such as 76, FIG. 3) associated with the line appearance of the incoming trunk.

Thereafter, the marker matches the line appearance of the incoming trunk with the link side appearance of an outgoing trunk in horizontal level 36 (FIG. 3). When these appearances have been matched, the call is completed through the network in the usual manner.

It may be well to here note a particular one of the many advantages of the invention. In prior art systems, the tandem trunk does not have an incoming trunk appearance which is directly related in the matrix to its outgoing or tandem appearance. Rather, the incoming and outgoing appearances could be associated only by, in effect, placing a new call from one appearance to the other. Hence, it has been the custom for the incoming end of a tandem trunk to apply a request marking to a number group translator for the read out of an artificial call simulating number. Then, the system has, in effect, placed a new call from the incoming end to the outgoing appearance in response to the artificially read out number.

The inventive system, on the other hand, provides the tandem trunk with incoming trunk and outgoing line appearances which are directly related to each other in the same manner and on the same switching matrix. Thus, the tandem call is completed by the simple expedient of switching over from one access point to another. In one exemplary system, the addition of the invention required only three relay contacts to make a tandem call, in addition to those required to complete ordinary calls. Compare this with the additional equipment required by the number group translation appearances and other call processing equipment required by the prior art systems.

Time is also saved by the invention which merely requires one relay to operate and extend a tandem call when the normal dial processing equipment detects an outgoing tandem code. Compare this one relay operation time with the holding time required by registers, markers, etc., when they set up a new and independent call to extend the tandem connection. Those skilled in the art will readily perceive other advantages, not mentioned above.

While the principles of the invention have been described above in connection with specific apparatus and applications, it is to be understood that this description is made only by way of example and not as a limitation on the scope of the invention.

I claim:

1. A unitary switching network having a plurality of verticals split into electrically isolated sections, means for utilizing a first section on each vertical for routing traffic having a maximum concentration, means for utilizing a second section on each vertical for routing traffic having a minimum concentration, a plurality of trunk lines, means for giving each trunk line an appearance in both of said sections in the network to provide for an insertion and exit of traffic at points of both the minimum and the maximum traffic concentration, means responsive to incoming calls received over a trunk line for inserting traffic into the network at the point of minimum traffic concentration, and means responsive to outgoing calls for sending traffic out over the trunk line with exit from said network at a point of maximum traffic concentration.

2. The unitary switching network of claim 1 wherein said network comprises a plurality of crosspoints arranged in blocks of crosspoints, means for giving said minimum traffic lines access to said network by the selective operation of a combination of relays which identify the coordinates of a block of said contacts, means responsive to said operation of said relays for extending a plurality of sleeve leads into a marker having access to said identified block, means for selecting one lead from among said extended sleeve leads, and means responsive jointly to idle tests performed by said marker and potentials on the selected sleeve for selecting a usable crosspoint in said block of crosspoints.

3. The network of claim 2, wherein said accessed sleeve leads include the sleeves of those of said plurality of trunks which are connected to selected block of contacts thereby giving each of said trunks an incoming trunk appearance among the minimum traffic lines of said network.

4. The network of claim 2 and marker means, means jointly responsive to a call received over an incoming one of said trunks and said marker for completing a function to identify the location of the calling trunk in terms of the block of crosspoints and individual line locations of said trunk in said network, means responsive to the receipt of signals received over said trunk which indicate an outgoing trunk for operating an individual block selecting relay, means responsive to the operation of said relay for closing circuits from said sleeve leads to hold magnets on a crossbar switch to operate a particular crosspoint associated with the line appearance of the trunk.

5. The circuit of claim 4 and means for matching the minimum concentration appearance of the incoming trunk with the maximum concentration appearance of the outgoing trunk, and means responsive to the matching of these appearances for completing a switch path through the network.

6. A telephone system comprising a plurality of offices interconnected by a plurality of two-way trunk lines, each of said offices comprising a plurality of subscriber lines, and control links, a unitary switching network assembled from a plurality of crossbar switches, each of said switches having verticals which are split into a plurality of electrically isolated sections, means for connecting said lines to certain of said sections and said control links to other of said sections, means for giving each of said trunk lines an appearance in the network at both of the points where said lines and said links are connected, means responsive to incoming calls received over a trunk line for inserting traffic into the network at the line appearance of that trunk line, and means responsive to outgoing calls for sending traffic out over the trunk line with the exit from said network at the link appearance of that trunk.

7. The system of claim 6 and marker means for controlling said network, said network having its crosspoints arranged in blocks of crosspoints, means for giving said lines access to said network by the selective operation of a combination of relays which identify the coordinates of a block of crosspoints in which the accessed line appears, means responsive to said operation of said relays for extending into said marker a plurality of sleeve leads in which the sleeve of the accessed line appears, means responsive to potentials appearing on said sleeve leads for selecting one lead from among said sleeve leads, and means responsive jointly to idle tests performed by said marker and potentials appearing on the selected sleeve for selecting a particular crosspoint in said identified block of crosspoints.

8. A tandem switching system utilizing a unitary network having line appearances on one side and link appearances on the other side, a plurality of double ended trunks having appearances among both said lines and said links, comprising a plurality of means responsive to the receipt of a call over an incoming trunk for completing a function to identify the location of the line appearance of the calling trunk, means responsive to signals received over said calling trunk which indicate an outgoing trunk for matching the line side appearance of the incoming trunk with the link side appearance of the outgoing trunk, and means responsive to the matching of these appearances for completing the call through the network.

9. The system of claim 8 and means whereby said call completing means completes a tandem call by transferring an incoming call from the link side to the line side without requiring the effective placing of a new call to reach the outgoing tandem appearance.

References Cited

UNITED STATES PATENTS

| | | | |
|---|---|---|---|
| 3,268,667 | 8/1966 | Arseneau | 179—18.7 |
| 3,308,242 | 3/1967 | Erwin | 179—22 |
| 3,317,676 | 5/1967 | Ekbergh et al. | 179—22 |

KATHLEEN H. CLAFFY, *Primary Examiner.*

L. A. WRIGHT, *Assistant Examiner.*